United States Patent
Chauvel et al.

(10) Patent No.: US 6,792,508 B1
(45) Date of Patent: Sep. 14, 2004

(54) CACHE WITH MULTIPLE FILL MODES

(75) Inventors: Gerard Chauvel, Antibes (FR); Serge Lasserre, Frejus (FR); Dominique Benoit Jacques d'Inverno, Villeneuve-Loubet (FR)

(73) Assignee: Texas Instruments Incorporated, Dallas, TX (US)

( * ) Notice: Subject to any disclaimer, the term of this patent is extended or adjusted under 35 U.S.C. 154(b) by 662 days.

(21) Appl. No.: 09/591,656

(22) Filed: Jun. 9, 2000

(30) Foreign Application Priority Data

Dec. 6, 1999 (EP) .......................... 99403041

(51) Int. Cl.$^7$ .............................. G06F 12/08
(52) U.S. Cl. ............ 711/128; 711/145; 711/144; 711/133
(58) Field of Search ................ 711/128, 118, 711/129, 133, 145, 144, 206, 207, 208, 125, 137; 712/23, 205

(56) References Cited

U.S. PATENT DOCUMENTS

| | | | |
|---|---|---|---|
| 5,410,669 A | | 4/1995 | Biggs et al. |
| 5,822,755 A | * | 10/1998 | Shippy .................. 711/118 |
| 5,966,737 A | * | 10/1999 | Steely et al. ............ 711/213 |
| 6,101,595 A | * | 8/2000 | Pickett et al. ........... 711/128 |
| 6,185,657 B1 | * | 2/2001 | Moyer .................... 711/128 |
| 6,415,353 B1 | * | 7/2002 | Leung .................... 711/106 |

FOREIGN PATENT DOCUMENTS

EP  0 529 217 A1  9/1993

OTHER PUBLICATIONS

"Optimizing Primary Data Caches for Parallel Scientific Applications: The Pool Buffer Approach", Liuxi Yang and Josep Torrellas, Proceedings of the International Conference on Supercomputing, US, New York, ACM, vol. Conf. 10, 1996, pp. 141–148, XP000683017, ISBN: 0–89791–803–7.

* cited by examiner

*Primary Examiner*—Pierre Bataille
(74) *Attorney, Agent, or Firm*—Ronald O. Neerings; Wade James Brady III; Frederick J. Telecky, Jr.

(57) ABSTRACT

A cache architecture (16) for use in a processing device includes a RAM set cache for caching a contiguous block of main memory (20). The RAM set cache can be used in conjunction with other cache types, such as a set associative cache or a direct mapped cache. A register (32) define a starting address for the contiguous block of main memory (20). The data array (38) associated with the RAM set may be filled on a line by line basis, as lines are requested by the processing core, or on a set-fill basis which fills the data array (38) when the starting address is loaded into the register (32). As addresses are received from the processing core hit miss logic (46) the starting address register (32), a global valid bit (34), line valid bits (37) and control bits (24, 26) are used to determine whether the data is present in the RAM set or whether the data must be loaded from main memory (20). The hit/miss logic (46) also determines whether a line should be loaded into the RAM set data array (38) or in the associated cache.

24 Claims, 3 Drawing Sheets

CACHE WITH MULTIPLE FILL MODES

CROSS-REFERENCE TO RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to processing devices and, more particularly, to a cache architecture for a processing device.

2. Description of the Related Art

Most processing devices use a cache architecture to increase the speed of retrieving information from a main memory. A cache memory is a high speed memory that is situated between the processing core of a processing device and the main memory. The main memory is generally much larger than the cache, but also significantly slower. Each time the processing core requests information from the main memory, the cache controller checks the cache memory to determine whether the address being accessed is currently in the cache memory. If so, the information is retrieved from the faster cache memory instead of the slower main memory. If the information is not in the cache, the main memory is accessed, and the cache memory is updated with the information.

As processing cores increase in speed relative to memory designs, the efficiency of the cache architecture becomes more significant. One way to increase efficiency is to increase the size of the cache. Since a larger cache memory can store more information, the likelihood of a cache hit is similarly increased. In most cases, however, increasing cache size has diminishing returns after a certain point. Further, increasing the cache size will increase the size of the chip (assuming the cache is integrated with the processing core). Even more importantly, access time will be increased, defeating the initial purpose of the cache. Accordingly, merely increasing the size of a cache will in many cases not produce worthwhile results.

In many devices, certain routines will have critical time constraints or will otherwise need a predictable execution time. In these cases, it can be critical to eliminate latencies due to cache misses. Some cache systems provide mechanisms for locking entries in a cache, so that the cache entries will not be overwritten as other locations are accessed. This mechanism is useful for entries that will be used repeatedly; however, locking entries of a cache reduces the size and associativity of the cache. For instance, in a 2-way set associative cache, locking some entries will result in a portion of the cache acting as a direct map, greatly reducing the efficiency of the cache. A similar solution uses a local memory working in parallel with the cache system. This solution requires address decoding for the local memory and a cache disabling mechanism, which can result in latencies. Further, while an implementation with a local RAM may work with routines specifically written to use the local RAM, other routines, specifically OS (operating system) routines not written in anticipation of the specific local RAM configuration will not be able to control the local RAM in the manner that the cache is controlled.

Therefore, a need has arisen for a cache architecture that increases cache performance and predictability.

BRIEF SUMMARY OF THE INVENTION

In a first embodiment of the present invention, a processing device comprises a processing core having circuitry for generating addresses to access a main memory and a cache. The cache comprises a data memory having a plurality of entries for storing information from the main memory, a tag register for storing address information defining a contiguous block of main memory addresses mapped to the data memory, a global valid bit to be set to either a valid state indicating that the data stored in the corresponding data memory is valid or an invalid state indicating that the data stored in the corresponding data memory is not valid, and logic for determining cache hits in the cache by based on a comparison of the address information in said tag register with corresponding bits from an address from the processing core and the state of said global valid bit.

In a second embodiment of the invention, associated with the address, a processing device comprises a processing core having circuitry for generating addresses to access a main memory and a cache. The cache comprises a data memory having a plurality of entries for storing information from the main memory, a tag register defining a contiguous block of main memory addresses mapped to the data memory, control circuitry for selectively filling the data memory either by set fill mode where all locations of the data memory are filled after setting the tag register or line-by-line fill mode where entries in the data memory are filled in response to an access by the processing core to a corresponding address sin the main memory, and logic for determining whether information accessed by the processing core is stored in the data memory.

The present invention provides significant advantages over the prior art. First, the RAM set cache (mapped to a contiguous block of main memory addresses) can significantly improve the operation of a processing device performing real-time operations, since a desired block of code can be stored in the RAM set cache for fast retrieval. Second, there is no extra penalty for accessing a larger data memory for a RAM set, cache as long as the access time of the RAM set is not bigger than the access time of the standard cache. Third, the addition of one or more RAM set caches can be provided with a minimal amount of circuitry over a conventional cache. Fourth, the RAM set caches can be configured in a very flexible manner with other caches, such as a set associative or direct map cache, as desired. Fifth, the RAM set cache provides advantages over a local RAM, because a separate mechanism for loading the data memory is not necessary for the RAM set cache and no specific address decoding in serial with the memory access time is required. Sixth, the cache can be controlled by the OS or other software in the same manner as an ordinary cache—loading, flushing, line invalidation, and so on, can be performed by the software without knowledge of the specific architecture of the cache, or with minor modifications to a driver for the OS.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is beset understood in relation to FIGS. 1–4 of the drawings, like numerals being used for like elements of the various drawings.

Figure 1:
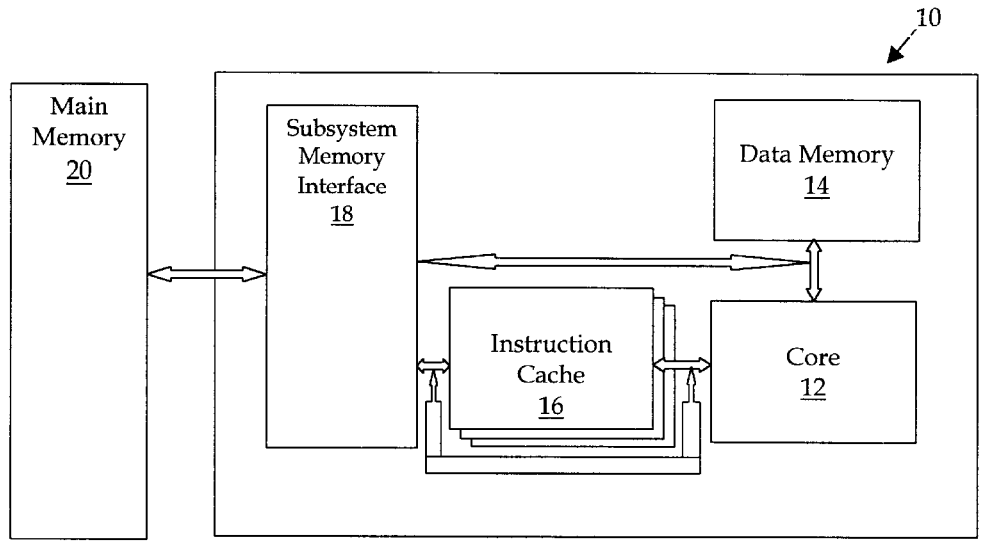
FIG. 1 illustrates a block diagram of a processing device incorporating a cache.

FIG. 1 illustrates a block diagram of a processing device 10. Processing device 10 includes a processing core 12, data memory 14, instruction cache 16, and subsystem memory interface 18. Subsystem memory interface 18 interfaces with main memory 20, which is typically an external memory.

As described in greater detail below, in the preferred embodiment, the instruction cache is a 3-way cache with one cache way being a "RAM set" cache memory. The RAM set cache is designed to cache a contiguous block of memory starting from a chosen main address location. The other two cache ways can be configured as RAM set cache memories, or use another architecture. For example, the instruction cache 16 could be configured as one RAM set cache and a 2-way set associative cache.

In operation, the processing core 12 accesses main memory 20 within a given address space. If the information at a requested address in main memory is also stored in the instruction cache 16, the data is retrieved from the instruction cache. If information for requested address is not stored in the instruction cache, the information is retrieved from the main memory 20 and the instruction cache is updated with the retrieved information.

Figure 2:
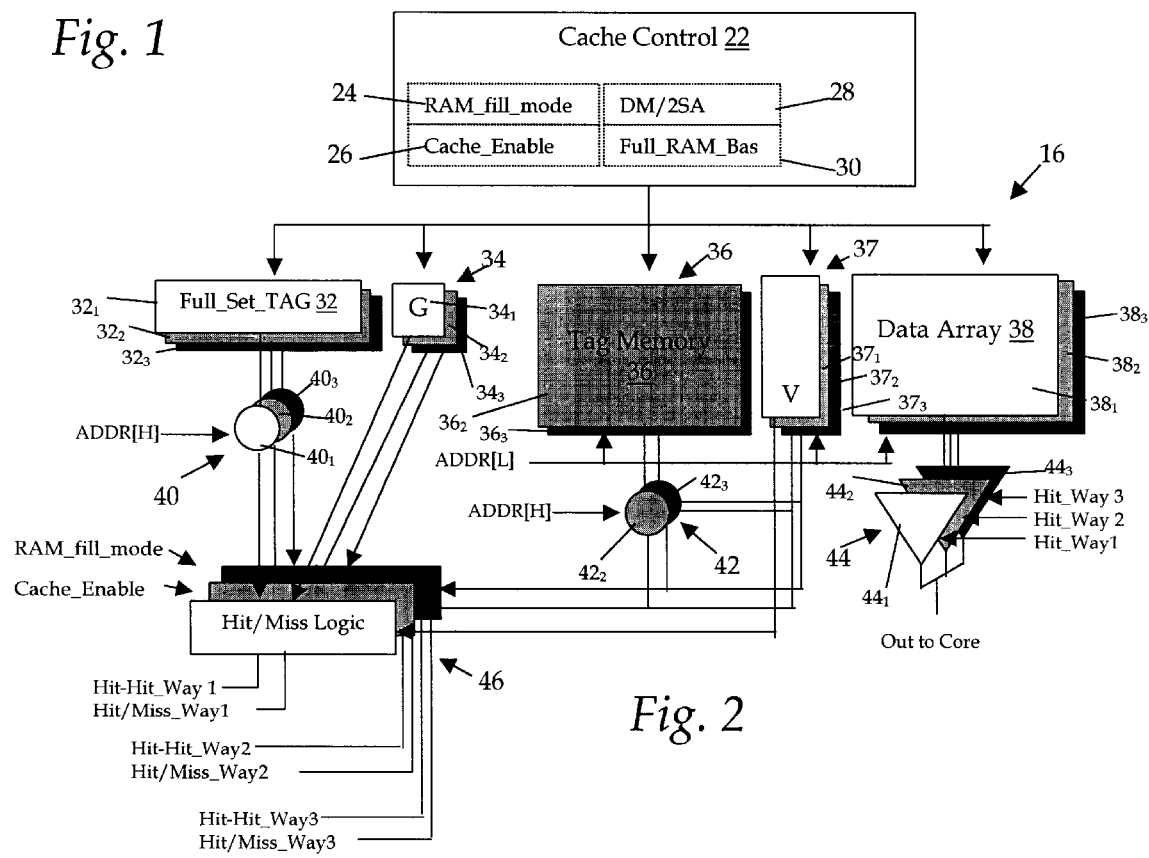
FIG. 2 illustrates a block diagram of a preferred embodiment of a cache architecture.

FIG. 2 illustrates a more detailed block diagram of the instruction cache 16, in an embodiment with a RAM set cache and a two-way set associative cache.

A cache controller 22 controls operation of the instruction cache 16. Cache controller 22 includes four status bits: RAM_fill_mode 24, Cache_Enable 26, DM/2SA 28 and Full_RAM_base 30. Cache controller 22 is coupled to Full_Set_Tag registers 32 (individually referenced as registers $32_1$ through $32_3$), Global_Valid bits 34 (individually referenced as bits $34_1$ through $34_3$), tag memories 36 (individually referenced as tag memories $36_2$ and $36_3$), valid entry bit arrays 37 (individually referenced as bit arrays $37_1$ through $37_3$) and data arrays 38 (individually referenced as data arrays $38_1$ through $38_3$). Comparators 40 (individually referenced as comparators $40_1$ through $40_3$) are coupled to respective Full_Set_Tag registers 32. Comparators 42 (individually referenced as comparators $42_2$ and $42_3$) are coupled to respective tag memories 36. Output buffers 44 (individually referenced as buffers $44_1$ through $44_3$) are coupled to respective data arrays 38. Hit/Miss logic 46 (individually referenced as logic $46_1$ through $46_3$) is coupled to comparators 40, global valid bits 34, valid bits 37, RAM_fill_mode bit 24 and Cache_Enable bit 26.

In operation, instruction cache 16 is configured using the control bits 24, 26, 28 and 30. The Cache_Enable 26 allows the instruction cache to be enabled or disabled as in standard cache architecture. If the instruction cache 16 is disabled (Cache Enable=0) instruction read accesses are performed on the main memory 20 via the subsystem memory interface 18, without using the instruction cache 16. If the instruction cache is enabled (Cache_Enable=1), instructions executed from the instruction cache 16, in cases where such instructions are present in the instruction cache 16. If a miss occurs, a line (for example, 16 bytes) is fetched from main memory 20 and provided to the core 12. This is also standard cache behavior.

The size of the data array $38_1$ can be different than the size of the data arrays $38_{2,3}$ for the other ways of the cache. For illustration purposes, it will be assumed that data arrays $38_2$ and $38_3$ are each 8 Kbytes in size, configured as 512 lines, with each line holding eight two-byte instructions. Data array $38_1$ is 16 Kbytes in size, configured as 1024 lines, each line holding eight two byte instructions. ADDR[L] is used to address one line of the data array 38 and valid bit array 37 (and tag memory 36 where applicable). Accordingly for the 1024-line first way, ADDR[L] will include bits [13:4] of an address from the core. For the 512-line second and third ways, ADDR[L] will include bits [12:4] of an address from the core. ADDR[H] defines which set is mapped to a line. Hence, assuming a 4 Gbyte (2 Gword) address space, ADDR[H] uses bits [31:14] of an address from the core for the first way and uses bits [31:13] for each of the second and third ways of the cache 16.

The tag memories 36 and comparators 42 are used for a 2-way set associative cache. When the core 12 performs a memory access, the tag memories 36 are accessed at the low order bits of the address (ADDR[L]). The tag memory locations store the high order address bits of the main memory address of the information stored in a corresponding line of the data array 38. These high order address bits are compared with the high order address bits (ADDR[H]) of the address from the core 12. If the ADD[H] matches the contents of the tag memory at ADDR[L], a hit occurs if the valid bit associated with the low order bits (V[ADDR[L]]) indicates that the cache entry is valid. If there is a cache hit, the data from the corresponding data array 38 at ADDR[L] may be provided to the core 12 by enabling the proper output buffer 44. As described below, data from the 2-way cache is presented to the core 12 only if there is a miss in the RAM set cache. By itself, the operation of the 2-way set associative cache and the direct map cache can be conventional and is not affected by the RAM set cache. Other cache techniques could also be used in conjunction with the RAM set cache.

Figure 3:
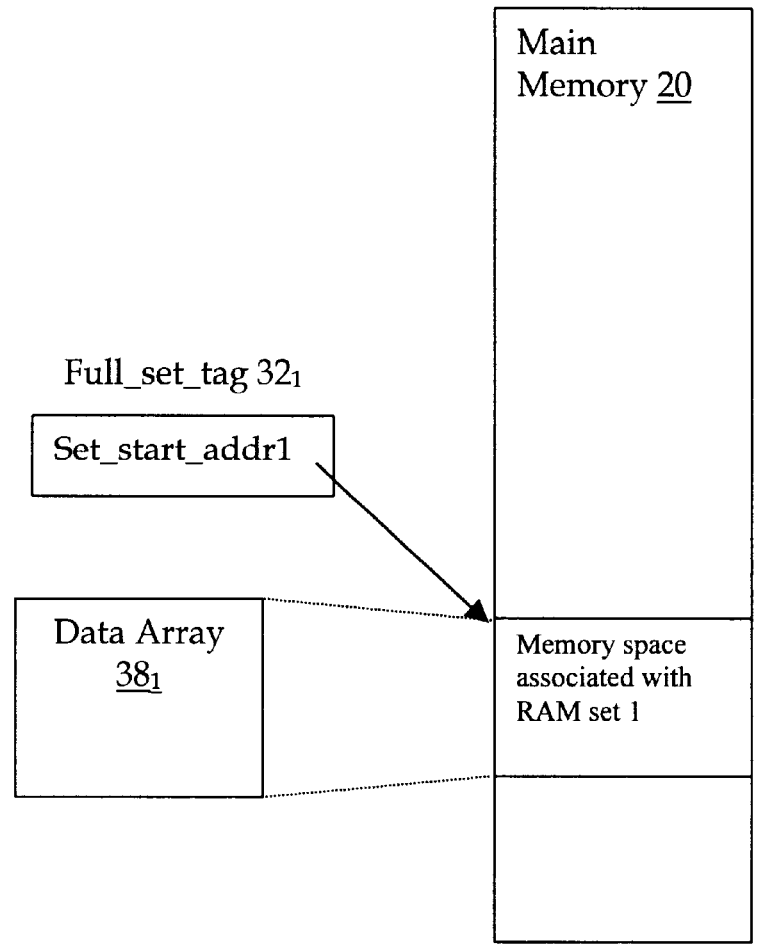
FIG. 3 is a diagram showing the mapping of a portion of main memory onto a RAM set cache.

The RAM set cache stores a contiguous block of main memory 20 starting at an address defined by the Full_set_tag register 32 for the RAM set. This block of information is mapped to the corresponding data array 38 of the RAM set. Only the high order bits of the starting address are stored in the Full_set_tag register 32. FIG. 3 illustrates this mapping for a single RAM set. As shown, the contents of Full_set_tag register $32_1$ defines the starting address for a contiguous block of memory cached in data array $38_1$.

A RAM set miss occurs when the high order bits of the address from the core 12 do not match the contents of the Full_set_TAG register 32 or the global valid bit equals "0". In either case, when there is a RAM set miss, the instruction cache 16 behaves like a normal 2-way cache logic—if there is a hit in the 2-way cache, then an instruction is presented to the core 12 from the 2-way set associative cache; otherwise the instruction is retrieved from main memory 20.

A RAM set hit situation occurs when the high order bits of the address from the core 12 match the contents of the Full_set_TAG register 32 and the global valid bit equals "1" (the setting of the global valid bit is described in greater detail hereinbelow). The RAM set comparison has the highest priority by default. A hit situation indicates that the requested instruction is mapped to the RAM set. If the Valid entry bit 37 corresponding to the line containing the instruction is set to "1", the logic 40 generates a hit-hit signal, because the address hit the RAM set and the instruction is present in the RAM set. If the corresponding valid bit of the RAM set entry 37 is "0", the logic generates a hit-miss because the address hit the RAM set but the instruction is not yet present in the RAM set. In that case, the instruction is fetched from main memory 20 and is loaded into the data array 38 of the RAM set. A hit in the RAM set logic takes precedence over the normal cache logic. The standard logic of the 2-way cache always generates a miss when the RAM set logic generates a hit. Information can reside in both the RAM set and the 2-way cache without causing any misbehavior; the duplicated cache entry in the 2-way cache will eventually be evicted by the replacement mechanism of the two-way cache, because it will never be used To set up a RAM set for operation, the Full_set_tag register 32 must be loaded with the start address (set_start_addr) and the RAM_fill_mode bit 24 must be configured to a desired fill mode. The circuitry for filling the cache can be the same as that used to fill lines of the set associative cache. In the preferred embodiment, two fill modes are provided: a line-by-line fill mode or set fill mode.

For a line-by-line fill (RAM_fill_mode=0), the global valid bit 34 is set to "1" and the valid entry bits 37 are set to "0" when the Full_set_tag register 32 is loaded with the starting address. At this point, the data array 38 is empty (it is assumed that the Cache_Enable bit 26 is set to "1" to allow operation of the instruction cache). Upon receiving an address from the core 12, a valid entry bit 37 is selected based on the low order bits of the address. As provide above, if the RAM set is 16 Kbytes in size, organized as an array of 1K×16 bytes, where 16 bytes is equivalent to a block line in the associated 2 way cache, the Full_start_TAG register will store 18 bits [31:14] of the starting address (set_start_addr). The address indexing each entry of the RAM set (ADDR[L]) will have 10 bits [13:4] and the instruction address used to access one instruction in the line, will have 3 bits [3:1] (assuming instructions are 2 bytes wide). A line of the data array 38 (at ADDR[L]) is loaded from main memory 20 each time that a hit-miss situation occurs because (1) the comparator 40 determines a match between ADDR[H] and Set_start_addr, (2) the Global valid bit 34 is set to "1" and (3) the valid bit 37 associated with the line at ADDR[L] is cleared (V[ADDR[L]]="0"). This situation indicates that the selected line is mapped to the RAM set, but has not yet been loaded into the RAM set's data array 38. When the line is loaded into the data array 38 from main memory 20, the valid bit 37 corresponding to the line is set to "1". This loading procedure has the same time penalty as a normal cache line load, but the entry will stay in the RAM set like a locked entry and therefore,the processing device will not be penalized on a subsequent access.

On the other hand, if a set fill (RAM_fill_mode) is chosen, the global valid bit 34 is initially set to "0" and remains "0" after the Full_set_tag register is loaded with the starting address. The valid bits 37 are also set to "0". When the starting address is written tothe Full_set_tag register 32, the associated data array 38 is filled through a DMA (direct memory access) process. As each line is loaded from main memory 20, the valid entry bit 37 corresponding to the line is set to "1". After the data array 38 has been completely loaded from main memory 20, the global valid bit 34 is set to "1". This initialization of the data array 38 takes longer than the line-by-line fill mode, but all critical real-time routines are available after initialization and the system latency is deterministic. After the RAM set is initialized in set fill mode, there will never be a miss on code mapped to the RAM set, even on the first access.

In either set-fill or line-by-line fill modes, the contents of a RAM set can be changed simply by writing a new Set_start_addr into the Full_set_tag register 32. Writing to this register flushes the contents of the respective set and initiates a load process according to the fill mode. The control circuitry 22 can use the same circuitry for flushing lines of the RAM set cache as is used for the set associative cache. Flushing an entire RAM set cache can be accomplished simply by writing to the appropriate Full_set_tag register 32. Similarly, the control circuitry 22 can use the same circuitry for filling lines of the RAM set cache as is used for the set associative cache. The operation for filling an entire cache in set fill mode is slightly different because multiple lines, rather than a single line, are accessed from the main memory 20 and stored in the data array 38. The RAM set cache can be used with an OS that is not specifically designed to operate with a RAM set cache through the use of minor driver modifications.

The operation of the Hit/Miss logic is described in connection with the flow chart of FIG. 4. In step 50, an address is received from the core 12 in connection with a read operation. If the instruction cache is disabled in step 52, the instruction is retrieved from main memory 20 in step 54. If the cache is enabled, then if either the high order bits of the address from the core (ADDR[H]) do not match the high order bits of the starting address (Set_start_addr) or the global valid bit 34 is set to "0" (step 56), then there is a RAM set miss. In this case, if there is a cache hit in the 2-way set associative cache (step 58), then the information retrieved from the 2-way set associative cache is presented to the core 12. If there is a miss in the 2-way set associative cache, the line is loaded into the 2-way cache.

Returning again to step 56, if both the high order bits of the address from the core (ADDR[H]) match the high order bits of the starting address (Set_start_addr) and the global valid bit 34 is set to "1", then there is a RAM set hit at the line corresponding to ADDR[L], and the valid entry bits are used to determine whether it is a hit-hit situation (where the requested instruction is present in the RAM set and can be presented to the core 12) or a hit-miss situation (where the requested instruction is mapped to the RAM set, but the information needs to be loaded into the RAM set's data array 38 from the main memory 20). If, in step 64, the valid entry bit 37 for the line indicates that the line is valid (V[ADDR[L]]=1), the instruction is present in the RAM set and is presented to the core 12 through the RAM set's output buffer 44. If, on the other hand, the valid entry bit 37 for the line indicates that the line is not valid (V[ADDR[L]]=0), the line is loaded into the data array 38 of the RAM set from main memory in step 68.

Figure 4:
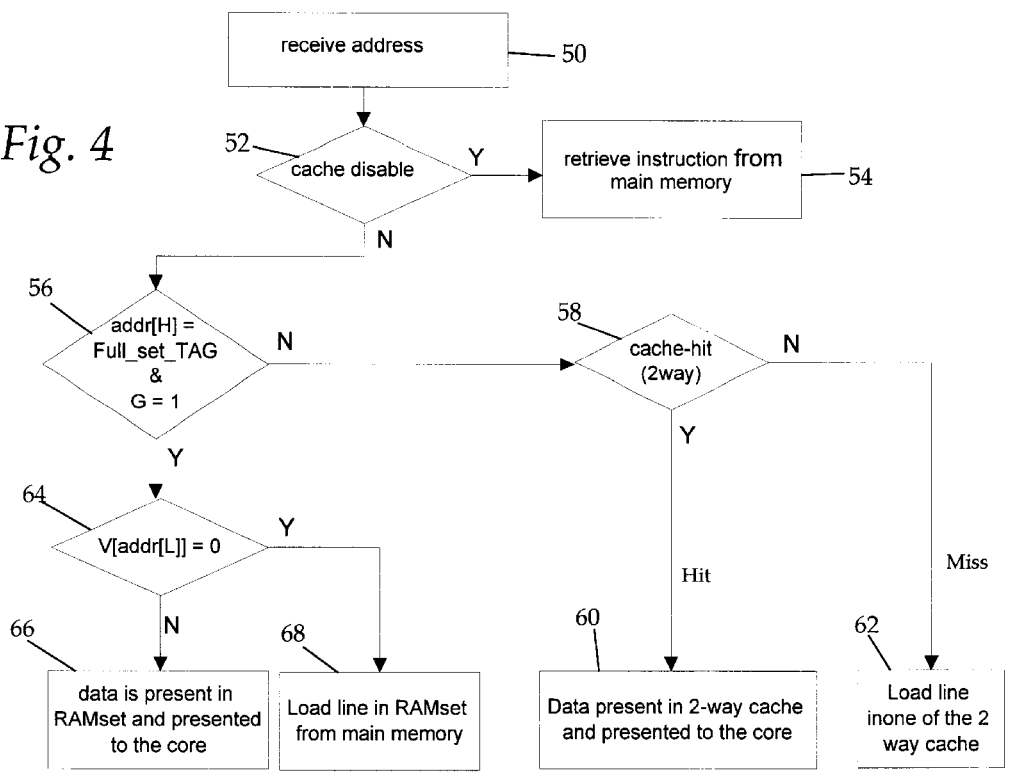
FIG. 4 illustrates a flow diagram describing operation of the hit/miss logic of FIG. 2.

The flow chart of FIG. 4 can be easily implemented using combinational logic.

In the preferred embodiment, the cache 416 provides flexibility in providing one, two, or thee RAM sets, since different applications for the processing device 10 have different real-time requirements. In this embodiment, control bits DM/2SA 28 and Full_RAM_base 30 define the allocation of RAM sets in the 3-way cache architecture. Table I describes the possibilities for the illustrated embodiment.

TABLE I

Cache Configurations

| Full_RAM_base | DM/2SA | Configuration |
|---|---|---|
| 0 | 0 | One 2-way set associative cache and one RAM set cache |
| 1 | 0 | One direct map cache and a two set RAM cache |
| 1 | 1 | Three set RAM cache |

The Full_set_tag register 32 uses a number of bits equal to the length of ADDR[H] for the associated way of the cache. Hence, Full_set_tag register $32_1$ stores bits [31:14] and Full_set_registers $32_2$ and $32_3$ store bits [31:13], for the specific data array sizes and configurations defined herein.

In a 2-way set associative cache, both tag memories 36 are used; in a direct map cache a single tag memory 36 is used. The tag memories 36 are not used for any of the caches configured as RAM set caches. Thus, for the configuration using a single RAM set cache and a 2-way associative cache, the RAM set cache uses Full_set_tag register $32_1$, global valid bit $34_1$, valid entry bits $37_1$, data array $38_1$, comparator $40_1$, Hit/miss logic $46_1$, and output buffer $44_1$. The 2-way set associative cache would use tag memories $36_2$ and $36_3$, valid bits $37_2$ and $37_3$, data arrays $38_2$ and $38_3$, Hit/miss logic $46_2$ and $46_3$ and output buffers $44_2$ and $44_3$. For a configuration using two RAM sets and a direct mapped cache, the RAM sets would use Full_set_tag registers $32_1$ and $32_2$, global valid bits $34_1$ and $34_2$, valid entry bits $37_1$ and $37_2$, data arrays $38_1$ and $38_2$, comparators $40_1$ and $40_2$, Hit/miss logic $46_1$ and $46_2$, and output buffers $44_1$ and $44_2$. The direct mapped cache would use tag memory $36_3$, valid bits $37_3$, data array $38_3$, Hit/miss logic $46_3$ and output buffer $44_3$. For a configuration using three RAM sets, the RAM sets would use Full_set_tag registers $32_1$, $32_2$ and $32_3$, global valid bits $34_1$, $34_2$ and $34_2$, valid entry bits $37_1$, $37_2$ and $37_3$, data arrays $38_1$, $38_2$ and $38_3$, comparators $40_1$, $40_2$ and $40_3$, Hit/miss logic $46_1$, $46_2$ and $46_3$, and output buffers $44_1$, $44_2$ and $44_3$.

While the embodiment shown-provides a 3-way cache, any number of cache-ways could be provided. For example, a 4-way cache could be configured to use and combination of RAM set and set associative, or other, cache architectures. The only additional hardware needed for the additional RAM set cache would be the additional Full_set_tag register and the global valid bit.

The RAM set cache is compatible with self-modifying code. If the processing core 12 changes an instruction dynamically, the line containing the modified location is flushed from the cache (i.e., its corresponding valid bit 37 is set to "0") in parallel with the write operation to main memory. The next time that the instruction is requested by the core 12, the corresponding valid bit will be set to "0" causing a hit-miss condition. The line containing the requested instruction will be loaded into the RAM set cache from main memory. In the preferred embodiment, instructions are not modified in the cache directly, eliminating the need to update the main memory when replacing a line in the cache.

While the invention has been discussed in connection with an instruction cache, it could also be used as a data cache, or as a unified instruction/data cache.

The present invention provides significant advantages over the prior art. First, the RAM set cache can significantly improve the operation of a processing device performing real-time operations, since a desired block of code can be stored in the Ram set for fast retrieval. Second, there is no extra penalty for accessing a larger data array 38 for a RAM set cache, as long as the access time of the RAM set is not bigger than the access time of the 2-way cache. Third, the addition of one or more RAM set caches can be provided with a minimal amount of circuitry over a conventional cache. The only additional circuitry required is one or more Full_Set_Tag registers 32 and the associated global valid bits 34 (the valid bits 37 are necessary for the RAM set(s) only when a line-by-line fill mode is available or self-modifying code is allowed; if the RAM set only supports set fill without self-modifying code, the valid bits 37 would be unnecessary). The valid bits 37 of a set associative or other cache can be used for the RAM set as well, if the valid bits are not included in the tag memory itself. Fourth, the RAM sets can be configured in a very flexible manner with other caches, such as a set associative or direct map cache, as desired. Fifth, the RAM set cache provides advantages over a local RAM, because a separate mechanism for loading the RAM is not necessary for the RAM set cache and no specific address decoding in serial with the memory access time is required. Sixth, the cache can be controlled by the OS or other software in the same manner as an ordinary cache—loading, flushing, line invalidation, and so on, can be performed by the software with minor software adaptation using conventional cache management.

While the present invention has been shown for a specific embodiment herein, it could be used in a number of implementations. First, the RAM set cache architecture could be used in any type of processing device, including microprocessors, DSPs, mixed analog/digital processors, and co-processors. Second, the sizes of the data arrays could be varied as needed for a certain implementation with minor modifications. For example, it may be desirable to have a RAM set with a larger data array than the set associative cache, or vice-versa, depending upon the size of the application with real-time constraints. Third, while the preferred embodiment allows the cache types to be mixed in a flexible manner, it maybe preferable in some circumstances to have set cache types, such as a single RAM set and a set associative cache. Fourth, the architecture used to implement non-RAM set caches (i.e., the set associative and direct mapped caches) could used different architecture from that shown herein; for example, a CAM (content addressable memory) could be used for the Tag memories 36.

Although the Detailed Description of the invention has been directed to certain exemplary embodiments, various modifications of these embodiments, as well as alternative embodiments, will be suggested to those skilled in the art The invention encompasses any modifications or alternative embodiments that fall within the scope of the Claims.

What is claimed is:

1. A processing device comprising:
   a processing core having circuitry for generating addresses to access a main memory;
   a cache comprising:
      a data memory having a plurality of addressable entries, where a contiguous block of information from said main memory is cached over contiguous addressable entries of said data memory;
      a tag register for storing address information defining an address range for the contiguous block of information from main memory mapped to said data memory;
      a global valid bit to be set to either a valid state indicating that the data stored in the corresponding data memory is valid or an invalid state indicating that the data stored in the corresponding data memory is not valid; and logic for determining cache hits in said cache based on a comparison of the address information in said tag register with corresponding bits from an address from said processing core and the state of said global valid bit.

2. The processing device of claim 1 wherein said data memory comprises a plurality of entries and further comprising a valid entry bit array having a valid entry bit for each entry in said data memory, where each valid entry bit is set to either a valid state indicating that the data stored in the corresponding entry of said data memory is valid and an invalid state indicating that the data stored in the corresponding entry of said data memory is not valid.

3. The processing device of claim 2 wherein said logic comprises logic for determining cache hits in said cache based on a comparison of the address information in said tag register with corresponding bits from an address from said processing core, the state of said global valid bit, and the state of a valid entry bit associated with said address.

4. The processing device of claim 3 and further comprising a cache disable status bit.

5. The processing device of claim 4 wherein said logic comprises logic for determining cache hits in said cache based on a comparison of the address information in said tag register with corresponding bits from an address from said processing core, the state of said global valid bit, the state of a valid entry bit associated with said address, and said cache disable status bit.

6. A processing device comprising:
a processing core having circuitry for generating addresses to access a main memory;
a cache comprising:
a data memory having a plurality of addressable entries, where a contiguous block of information from said main memory is cached over contiguous addressable entries of said data memory;
a tag register defining an address range for the contiguous block of information from main memory mapped to said data memory;
control circuitry for selectively filling said data memory either by set fill mode where all locations of said data memory are filled after setting said tag register or line-by-line fill mode where entries in said data memory are filled in response to an access by said processing core to a corresponding address in said main memory; and
logic for determining whether information accessed by said processing core is stored in said data memory.

7. The processing device of claim 6 wherein said circuitry for selectively filling comprises direct memory access circuitry.

8. The processing device of claim 6 wherein said cache and further comprises a global status bit.

9. The processing device of claim 8 wherein, in set fill mode, said global status bit is set to a predetermined value response to the completion of filling said data memory with data from said main memory.

10. The processing device of claim 8 wherein said cache further comprises a valid entry bit array having a valid entry bit for each entry in said data memory, where each valid entry bit is set to either a valid state indicating that the data stored in the corresponding entry of said data memory is valid and an invalid state indicating that the data stored in the corresponding entry of said data memory is not valid.

11. The processing device of claim 10 wherein, in line-by-line fill mode, said global status bit is set to a predetermined value responsive to setting said tag register with a desired address and, in response to a memory access to an address by said processing core, said control circuitry fills the corresponding entry in said data memory if said tag register is set to said predetermined value and said valid entry bit corresponding to the entry is in an invalid state.

12. The processing device of claim 10 wherein said valid entry bits are set to invalid states upon setting the tag register with said desired address.

13. A cache system comprising:
a data memory having a plurality of entries addressable entries, where a contiguous block of information from said main memory is cached over contiguous addressable entries of said data memory;
a tag register for storing address information defining an address range for the contiguous block of formation from main memory mapped to said data memory;
a global valid bit to be set to either a valid state indicating that the data stored in the corresponding data memory is valid or an invalid state indicating that the data stored in the corresponding data memory is not valid; and
logic for determining cache hits in said cache based on a comparison of the address information in said tag register with corresponding bits from an address from a processing core and the state of said global valid bit.

14. The cache system of claim 13 wherein said data memory comprises a plurality of entries and further comprising a valid entry bit array having a valid entry bit for each entry in said data memory, where each valid entry bit is set to either a valid state indicating that the data stored in the corresponding entry of said data memory is valid and an invalid state indicating that the data stored in the corresponding entry of said data memory is not valid.

15. The cache system of claim 14 wherein said logic comprises logic for determining cache hits in said cache based on a comparison of the address information in said tag register with corresponding bits from an address from said processing core, the state of said global valid bit, and the state of a valid entry bit associated with said address.

16. The cache system of claim 15 and further comprising a cache disable status bit.

17. The cache system of claim 16 wherein said logic comprises logic for determining cache hits in said cache based on a comparison of the address information in said tag register with corresponding bits from an address from said processing core, the state of said global valid bit, the state of a valid entry bit associated with said address, and said cache disable status bit.

18. A cache system comprising:
a data memory having a plurality of addressable entries, where a contiguous block of information from said main memory is cached over contiguous addressable entries of said data memory;
a tag register defining an address range for the contiguous block of information from main memory mapped to said data memory;
control circuitry for selectively filling said data memory either by set fill mode where all locations of said data memory are filled after setting said tag register or line-by-line fill mode where entries in said data memory are filled in response to an access by said processing core to a corresponding address in said main memory; and
logic for determining whether information accessed by a processing core is stored in said data memory.

19. The cache system of claim 18 wherein said circuitry for selectively filling comprises direct memory access circuitry.

20. The cache system of claim 18 wherein said cache and further comprises a global status bit.

21. The cache system of claim 20 wherein, in set fill mode, said global status bit is set to a predetermined value response to the completion of filling said data memory with data from said main memory.

22. The cache system of claim 20 wherein said cache further comprises a valid entry bit array having a valid entry bit for each entry in said data memory, where each valid entry bit is set to either a valid state indicating that the data stored in the corresponding entry of said data memory is valid and an invalid state indicating that the data stored in the corresponding entry of said data memory is not valid.

23. The cache system of claim 22 wherein, in line-by-line fill mode, said global status bit is set to a predetermined value responsive to setting said tag register with a desired address and, in response to a memory access to an address by said processing core, said control circuitry fills the corresponding entry in said data memory if said tag register is set to said predetermined value and said valid entry bit corresponding to the entry is in an invalid state.

24. The cache system of claim 22 wherein said valid entry bits are set to invalid states upon setting the tag register with said desired address.

* * * * *